United States Patent
Koide et al.

(10) Patent No.: US 9,665,253 B2
(45) Date of Patent: May 30, 2017

(54) INFORMATION PROCESSING DEVICE, SELECTION OPERATION DETECTION METHOD, AND PROGRAM

(71) Applicant: Sharp Kabushiki Kaisha, Osaka-shi, Osaka (JP)

(72) Inventors: Tomoko Koide, Osaka (JP); Hisashi Ide, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 206 days.

(21) Appl. No.: 14/418,615

(22) PCT Filed: Jul. 29, 2013

(86) PCT No.: PCT/JP2013/070469
§ 371 (c)(1),
(2) Date: Jan. 30, 2015

(87) PCT Pub. No.: WO2014/021261
PCT Pub. Date: Feb. 6, 2014

(65) Prior Publication Data
US 2015/0205495 A1    Jul. 23, 2015

(30) Foreign Application Priority Data

Aug. 2, 2012  (JP) .................................. 2012-172127

(51) Int. Cl.
*G06F 3/0482* (2013.01)
*G06F 3/0484* (2013.01)
(Continued)

(52) U.S. Cl.
CPC ........ *G06F 3/04842* (2013.01); *G06F 3/0418* (2013.01); *G06F 3/0482* (2013.01);
(Continued)

(58) Field of Classification Search
None
See application file for complete search history.

(56) References Cited

U.S. PATENT DOCUMENTS

| 8,018,452 B1* | 9/2011 | Dow ........................ G06T 11/60 |
| | | 345/418 |
| 8,451,248 B1* | 5/2013 | Kim ......................... G06F 3/016 |
| | | 341/27 |

(Continued)

FOREIGN PATENT DOCUMENTS

| JP | 2005-284379 A | 10/2005 |
| JP | 2007-147723 A | 6/2007 |

(Continued)

OTHER PUBLICATIONS

English translation of Official Communication issued in corresponding International Application PCT/JP2013/070469, mailed on Nov. 25, 2014.

(Continued)

*Primary Examiner* — Phenuel Salomon
(74) *Attorney, Agent, or Firm* — Keating & Bennett, LLP

(57) ABSTRACT

An information processing device has a touch position detection unit that detects the touch position on a display screen of a touch performed on the display screen of a display device, a pressing force value detection unit that detects the pressing force value of the touch, a display control unit that changes the display magnification of the display device when the pressing force value detection unit detects a pressing force value equal to or greater than a prescribed pressing force value, and a selection unit that establishes selection of an item to be selected, based on the touched position when the touch position detection unit detects that the touch is broken.

14 Claims, 18 Drawing Sheets

(51) Int. Cl.
　　　*G06F 3/0488*　　(2013.01)
　　　*G06F 3/041*　　(2006.01)

(52) U.S. Cl.
　　　CPC ........ *G06F 3/0488* (2013.01); *G06F 3/04883* (2013.01); *G06F 2203/04105* (2013.01); *G06F 2203/04805* (2013.01); *G06F 2203/04806* (2013.01)

(56) References Cited

U.S. PATENT DOCUMENTS

| | | | |
|---|---|---|---|
| 2005/0225540 A1 | 10/2005 | Kawakami et al. | |
| 2010/0070915 A1 | 3/2010 | Tsutsui et al. | |
| 2010/0231541 A1* | 9/2010 | Cruz-Hernandez | G06F 3/0488 345/173 |
| 2010/0267424 A1* | 10/2010 | Kim | G06F 3/016 455/566 |
| 2011/0054837 A1 | 3/2011 | Ikeda | |
| 2011/0057886 A1* | 3/2011 | Ng | G06F 3/0482 345/173 |
| 2011/0138275 A1* | 6/2011 | Yu | G06F 3/04817 715/702 |
| 2011/0205248 A1* | 8/2011 | Honda | G06F 3/0482 345/661 |
| 2012/0079390 A1* | 3/2012 | Ballagh | G09G 5/14 715/738 |
| 2012/0147052 A1* | 6/2012 | Homma | G06F 3/044 345/660 |

FOREIGN PATENT DOCUMENTS

| | | |
|---|---|---|
| JP | 2010-72754 A | 4/2010 |
| JP | 2010-102662 A | 5/2010 |
| JP | 2011-48666 A | 3/2011 |
| JP | 2011-53974 A | 3/2011 |

OTHER PUBLICATIONS

Hayashi et al., "Dekiru Net Plus", Nov. 29, 2007, Impress Corporation, http://dekiru.impress.co.jp/contents/007/00710.htm.

* cited by examiner

FIG. 6

| PRESSING FORCE MAXIMUM VALUE (REFERENCE PRESSING FORCE VALUE=1) | DISPLAY MAGNIFICATION (%) |
|---|---|
| ~ 1 | 100 |
| 1 ~ 1.1 | 125 |
| 1.1 ~ 1.2 | 150 |
| 1.2 ~ 1.3 | 200 |
| 1.3 ~ | 400 |

| PRESSING FORCE MAXIMUM VALUE (REFERENCE PRESSING FORCE VALUE=1) | DISPLAY MAGNIFICATION (%) |
|---|---|
| ~ 1 | 100 |
| 1 ~ 1.1 | 125 |
| 1.1 ~ 1.2 | 150 |
| 1.2 ~ 1.3 | 200 |
| 1.3 ~ 1.5 | 400 |
| 1.5 ~ 1.7 | 200 |
| 1.7 ~ 1.9 | 100 |
| 1.9 ~ 2.1 | 80 |
| 2.1 ~ | 60 |

| NUMBER OF TIMES PRESSING FORCE EQUALS OR EXCEEDS REFERENCE PRESSING FORCE VALUE | DISPLAY MAGNIFICATION (%) |
|---|---|
| 1ST TIME | 150 |
| 2ND TIME | 225 |
| 3RD TIME | 338 |
| 4TH TIME | 506 |
| 5TH TIME | 759 |

FIG. 20

| NUMBER OF TIMES PRESSING FORCE EQUALS OR EXCEEDS REFERENCE PRESSING FORCE VALUE | COEFFICIENT (%) | DISPLAY MAGNIFICATION (%) |
|---|---|---|
| 1ST TIME | 200 | 200 |
| 2ND TIME | 200 | 400 |
| 3RD TIME | 50 | 200 |
| 4TH TIME | 50 | 100 |
| 5TH TIME | 200 | 200 |

FIG. 21

| NUMBER OF TIMES PRESSING FORCE EQUALS OR EXCEEDS REFERENCE PRESSING FORCE VALUE | DISPLAY MAGNIFICATION (%) |
|---|---|
| 1ST TIME | 200 |
| 2ND TIME | 400 |
| 3RD TIME | 200 |
| 4TH TIME | 100 |
| 5TH TIME | 200 |
| ⋮ | ⋮ |

FIG. 22

| NUMBER OF TIMES PRESSING FORCE EQUALS OR EXCEEDS REFERENCE PRESSING FORCE VALUE | DISPLAY MAGNIFICATION (%) |
|---|---|
| 1ST TIME | 200 |
| 2ND TIME | 400 |
| 3RD TIME | 100 |
| 4TH TIME | 200 |
| 5TH TIME | 400 |
| ⋮ | ⋮ |

FIG. 23

| NUMBER OF TIMES PRESSING FORCE EQUALS OR EXCEEDS REFERENCE PRESSING FORCE VALUE | DISPLAY MAGNIFICATION (%) |
|---|---|
| 1ST TIME | 200 |
| 2ND TIME | 400 |
| 3RD TIME | 50 |
| 4TH TIME | 100 |
| 5TH TIME | 200 |
| ⋮ | ⋮ |

INFORMATION PROCESSING DEVICE, SELECTION OPERATION DETECTION METHOD, AND PROGRAM

TECHNICAL FIELD

The present invention relates to an information processing device, a selection operation detection method, and a recording medium.

The subject application claims priority based on the patent application No. 2012-172127 filed in Japan on Aug. 2, 2012 and incorporates by reference herein the content thereof.

BACKGROUND ART

A number of techniques related to selection operations on a screen, such as selection of hyperlinks included in a web page, have been proposed.

For example, in the mobile telephone handset described in Patent Reference 1, when a double-tap operation on the screen is detected during execution of a browser, a display control unit changes the screen display magnification. Also, when a hyperlink on a display of a webpage is selected by a single-tap operation during execution of a browser, the display control unit causes the webpage of a hyperlink destination to be displayed on a display unit.

This not only facilitates selection operations such as selection of hyperlinks on a screen, but also enables quick viewing of screens, even if display region on the display unit is small.

CITATION LIST

Patent Document

[Patent Document 1] Japanese Patent Laid-open Publication No. 2010-72754

DISCLOSURE OF THE INVENTION

Problems to be Solved by the Invention

With the mobile telephone handset described in Patent Reference 1, however, the user might confuse a single-tap operation with a double-tap operation.

Means for Solving the Problems

An information processing apparatus according to one aspect of the present invention has a touch position detection unit that detects the touch position on a display screen of a touch performed on the display screen of a display device, a pressing force value detection unit that detects the pressing force value of the touch, a display control unit that changes the display magnification of the display device when the pressing force value detection unit detects a pressing force value equal to or greater than a prescribed pressing force value, and a selection unit that establishes selection of an item to be selected, based on the touched position when the touch position detection unit detects that the touch is broken.

In the above-described information processing device, the display control unit may be constituted so as to determine the display magnification of the display device based on the pressing force value detected by the pressing force value detection unit.

In the above-described information processing device, the display control unit may be constituted so as to change the display magnification of the display device in accordance with the pressing force maximum value when the pressing force value detection unit detects an updating of the pressing force maximum value.

In the above-described information processing device, the display control unit may be constituted so as to cause the display device to make an enlarged display based on a pre-established fixed multiplier.

In the above-described information processing device, the display control unit may be constituted so as to change the display magnification of the display device when the pressing force value detection unit detects a pressing force value that is less than the prescribed pressing force value after detection of a pressing force value equal to or greater than the prescribed pressing force value, further followed by detection of a pressing force value again equal to or greater than the prescribed pressing force value.

In the above-described information processing device, the display control unit may be constituted so as to repeatedly increase and decrease the display magnification of the display device in accordance with the pressing force maximum value detected by the pressing force value detection unit.

In the above-described information processing device, the display control unit may be constituted so as to change the display format of an item to be selected if the item to be selected is displayed at a touch position detected by the touch position detection unit.

In the above-described information processing device, the item to be selected may be associated with link information, and the display control unit may be constituted so as to cause the display device to display with a standard magnification a link destination indicating an item to be selected, the selection of which is established by the selection unit based on the touch position when the touch position detection unit detects that the touch is broken.

In the above-described information processing device, the selection unit may be constituted so as to set a selection region of an item to be selected as a region larger than a region enlarged by the display magnification in a usual display enlarged on the display device by the display control unit.

In the above-described information processing device, the display control unit may be constituted so as to perform conventional processing not accompanied by a change of the display magnification in the state in which the pressing force value detection unit does not detect a pressing force equal to or greater than the prescribed pressing force value.

A selection operation detection method according to another aspect of the present invention is a selection operation detection method of an information processing device, having a touch position detection step of detecting a touch position on a display screen of a touch performed on the display screen of a display device, a pressing force value detection step of detecting the pressing force value of the touch, a touch breaking detection step of detecting the breaking of the touch, a display control step of changing the display magnification of the display device when in the pressing force value detection step a pressing force value equal to greater than a prescribed pressing force value is detected, and a selection step of establishing selection of an item to be selected, based on the touched position when in the touch breaking detection step the touch being broken is detected.

A program according to another aspect of the present invention causes an information processing device to execute: a touch position detection step of detecting a touch position on a display screen of a touch performed on the display screen of a display device, a pressing force value detection step of detecting the pressing force value of the touch, a touch breaking detection step of detecting the breaking of the touch, a display control step of changing the display magnification of the display device when the pressing force value detection unit detects a pressing force value equal to or greater than a prescribed pressing force value, and a selection step of establishing selection of an item to be selected, based on the touched position when in the touch breaking detection step the touch being broken is detected.

Effects of the Invention

Aspects of the present invention enable a user to make more reliable selection operations on a screen by simpler operations.

BRIEF DESCRIPTION OF THE DRAWINGS

FIG. 6 is a descriptive drawing showing an example of a display magnification table stored by a display magnification table storage unit in the same embodiment.

FIG. 7 is a descriptive drawing showing one more example of a display magnification table stored by the display magnification table storage unit in the same embodiment.

FIG. 19 is a descriptive drawing showing an example of the changing of the display magnification of the display device in the processing of FIG. 18 in the same embodiment.

FIG. 20 is a descriptive drawing showing an example of the changing of the display magnification of the display device for the case of the display control unit using a coefficient in accordance with the pressing force value detected by the pressing force value detection unit in the same embodiment.

FIG. 21 is a descriptive drawing showing an example of the display magnification table in which display magnifications are associated with the number of times the pressing force equals or exceeds a pressing force reference value in the same embodiment.

FIG. 22 is a descriptive drawing showing another example of the display magnification table in which the display magnifications are associated with the number of times the pressing force equals or exceeds a pressing force reference value in the same embodiment.

FIG. 23 is a descriptive drawing showing yet another example of the display magnification table in which the display magnifications are associated with the number of times the pressing force equals or exceeds a pressing force reference value in the same embodiment.

MODE FOR CARRYING OUT THE INVENTION

Figure 1:
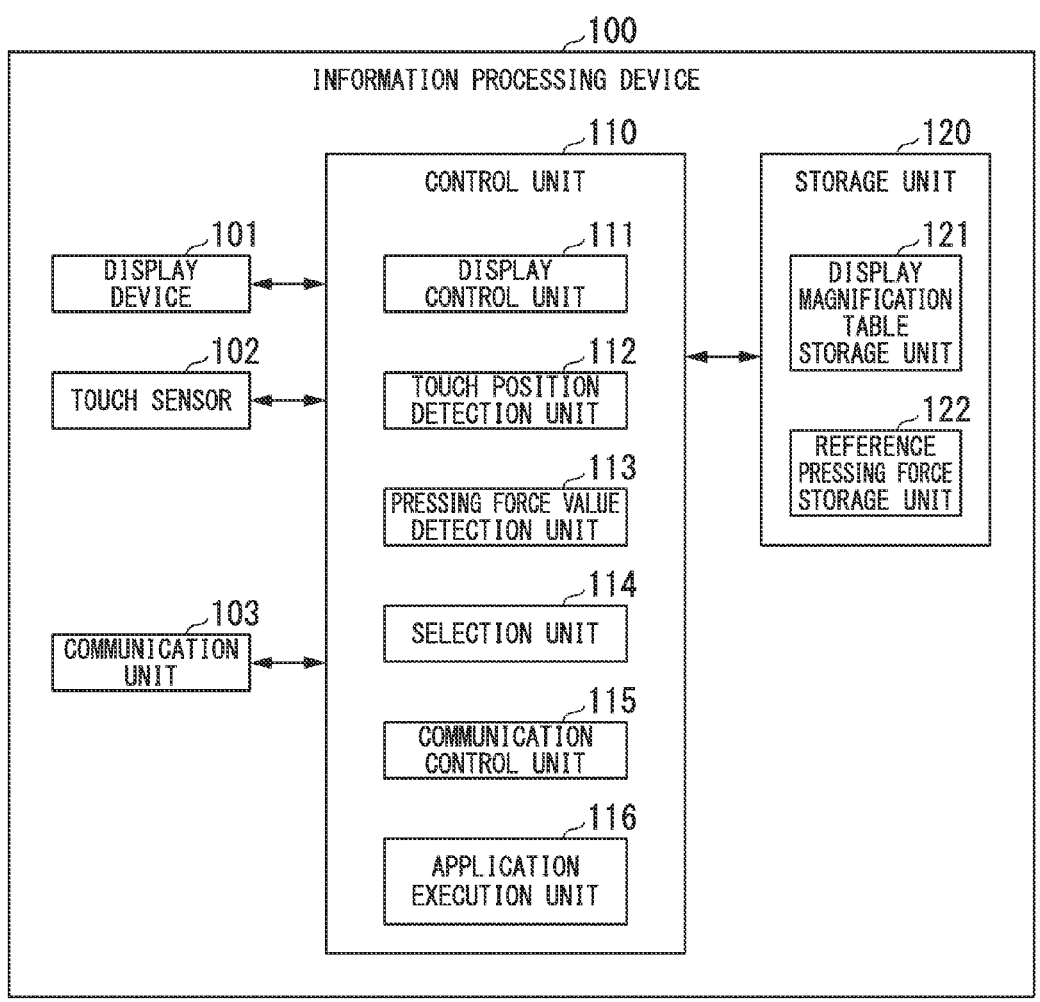
FIG. 1 is a simplified block diagram showing the functional constitution of an information processing device in one embodiment of the present invention.

Embodiments of the present invention will be described below, with references made to the drawings. FIG. 1 is a simplified block diagram showing the functional constitution of an information processing device in an embodiment of the present invention. In this drawing, the information processing device 100 has a display device 101, a touch sensor 102, a communication unit 103, a control unit 110, and a storage unit 120. The control unit 110 has a display control unit 111, a touch position detection unit 112, a pressing force value detection unit 113, a selection unit 114, a communication control unit 115, and an application execution unit 116. The storage unit 120 has a display magnification table storage unit 121 and a pressing force reference value storage unit 122.

The information processing device 100 has a touch panel type display screen and displays on a display screen an image including items to be selected, which are selectable by touch operations. In this case, the phrase item to be selected refers to an image (such as an icon or character string) associated with processing that is to be performed when the selection of the item to be selected is established. In the following, although the example given is that of text to which a hyperlinks are set being used as the items to be selected, the present invention can be applied as well to the case in which various items to be selected, such as icons or menu displays.

Various information processing devices having touch panel type display screens can be used as the information processing device 100. For example, the information processing device 100 may be a personal computer (PC), a portable terminal device such as a mobile telephone handset or smartphone, a portable information terminal (personal digital assistant; PDA), or a game machine.

The display device 101 has a display screen, such as a liquid-crystal display or organic EL (electro-luminescence) display and displays on the display screen various images, such as movies, still images, and text (characters), in accordance with control by the display control unit 111.

The touch sensor 102 is provided on the display screen of the display device 101 and, together with the display screen, constitutes a touch panel.

The communication unit 103 is connected to the Internet and transmits and receives various data.

The control unit 110 controls various parts of the information processing device 100 and provides various functions to a user of the information processing device 100 (hereinafter, simply referred to as the user). The control unit 110 is implemented, for example, by a CPU (central processing unit) of the information processing device 100 executing a program read out from the storage unit 120.

The display control unit 111 controls the display device 101 so as to cause it to display various images.

The touch position detection unit 112 detects the touch position based on a signal from the touch sensor 102. The term touch position as used herein refers to the position that the user touches with a finger or the like on the display screen of the display device 101. If the display screen is not touched, the touch position detection unit 112 outputs information indicating that a touch position is not detected. That is, the touch position detection unit 112 detects either the touch position or that the touch has been broken. The phrase touch being broken, as used herein, refers to the state in which display screen is not being touched.

The pressing force value detection unit 113 detects the pressing force value, based on a signal from the touch sensor 102. The term pressing force value as used herein refers to the pressing force by the user touching the display screen of the display device 101 with the finger or the like.

The selection unit 114 selects an item to be selected, based on the touch position detected by the touch position detection unit 112. The selection unit 114 establishes that a selection has been made when the touch is broken from the condition in which a touch as a selection operation of an item to be selected is being made.

The communication control unit 115 controls the communication unit 103 to cause it to communicate.

The application execution unit 116 provides various functions by executing application programs stored in the storage unit 120, in accordance with a user operation accepted by the touch sensor 102.

The storage unit 120 is implemented by a storage device provided in the information processing device 100 and stores various data.

The display magnification table storage unit 121 has pre-stored therein a display magnification table. The display magnification table indicates display magnifications for causing the display device 101 to make a magnified display, which will be described later, based on the pressing force value detected by the pressing force value detection unit 113.

The pressing force reference value storage unit 122 has pre-stored therein a pressing force reference value. The pressing force reference value is a prescribed pressing force value set as a threshold for judging whether or not to cause the display device 101 to make an enlarged display, which will be described later.

Figure 2:
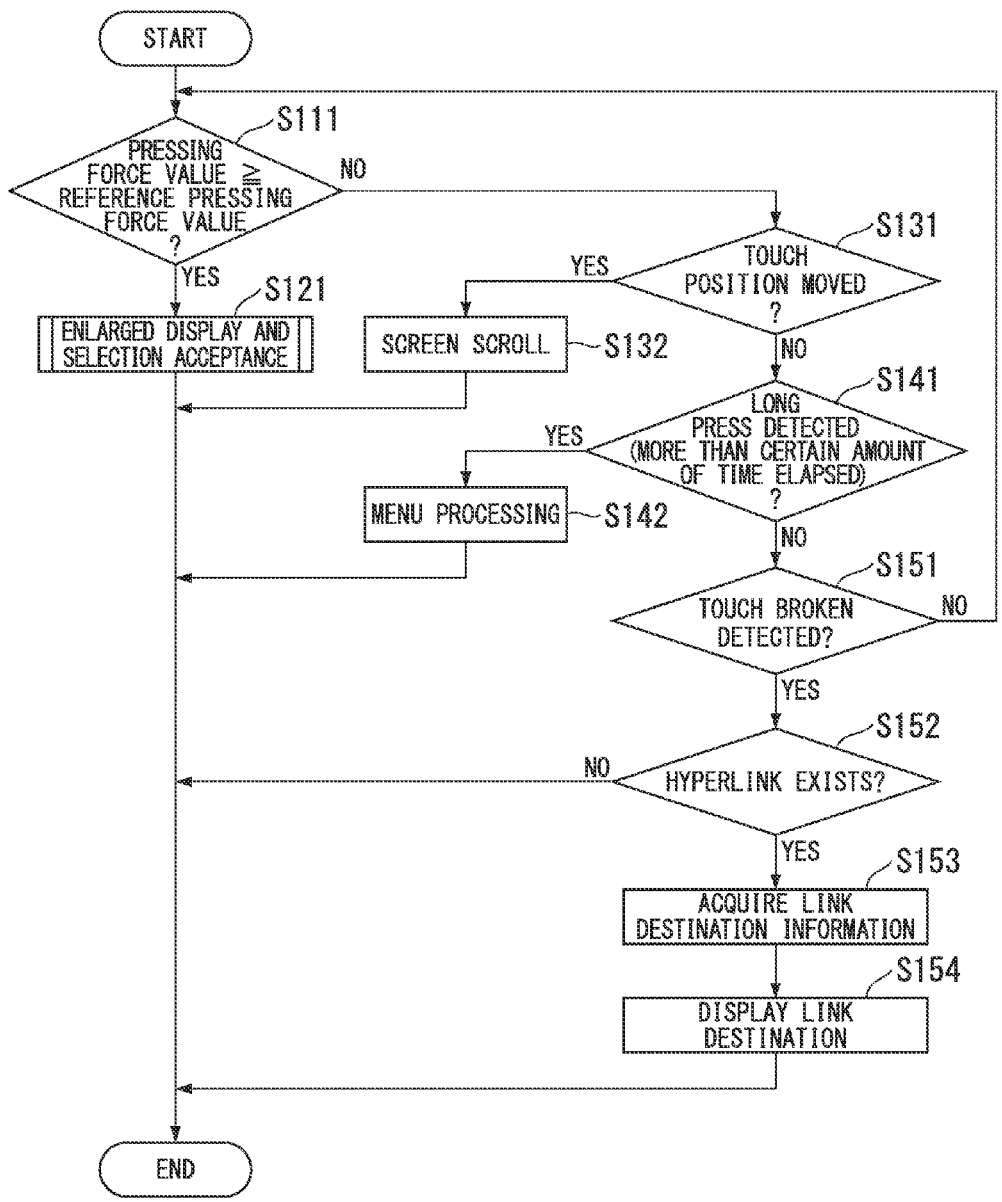
FIG. 2 is a flowchart showing the procedure of the processing done by the information processing device in the same embodiment.

FIG. 2 is a flowchart showing the procedure of processing performed by the information processing device 100. When the touch position detection unit 112 detects a touch, the information processing device 100 performs the processing in this drawing.

In the processing in this drawing, the display control unit 111 first judges whether or not the pressing force value detected by the pressing force value detection unit 113 is equal to or exceeds the pressing force reference value (step S111).

If the judgment is that the pressing force is smaller than the pressing force reference value (NO at step S111), the display control unit 111 judges whether or not the touch position moved (step S131). If the judgment is that the touch position has moved (YES at step S131), the display control unit 111 causes the display screen of the display device 101 to scroll in accordance with the movement of the touch position (step S132), after which the processing of FIG. 2 is ended.

Figure 3:
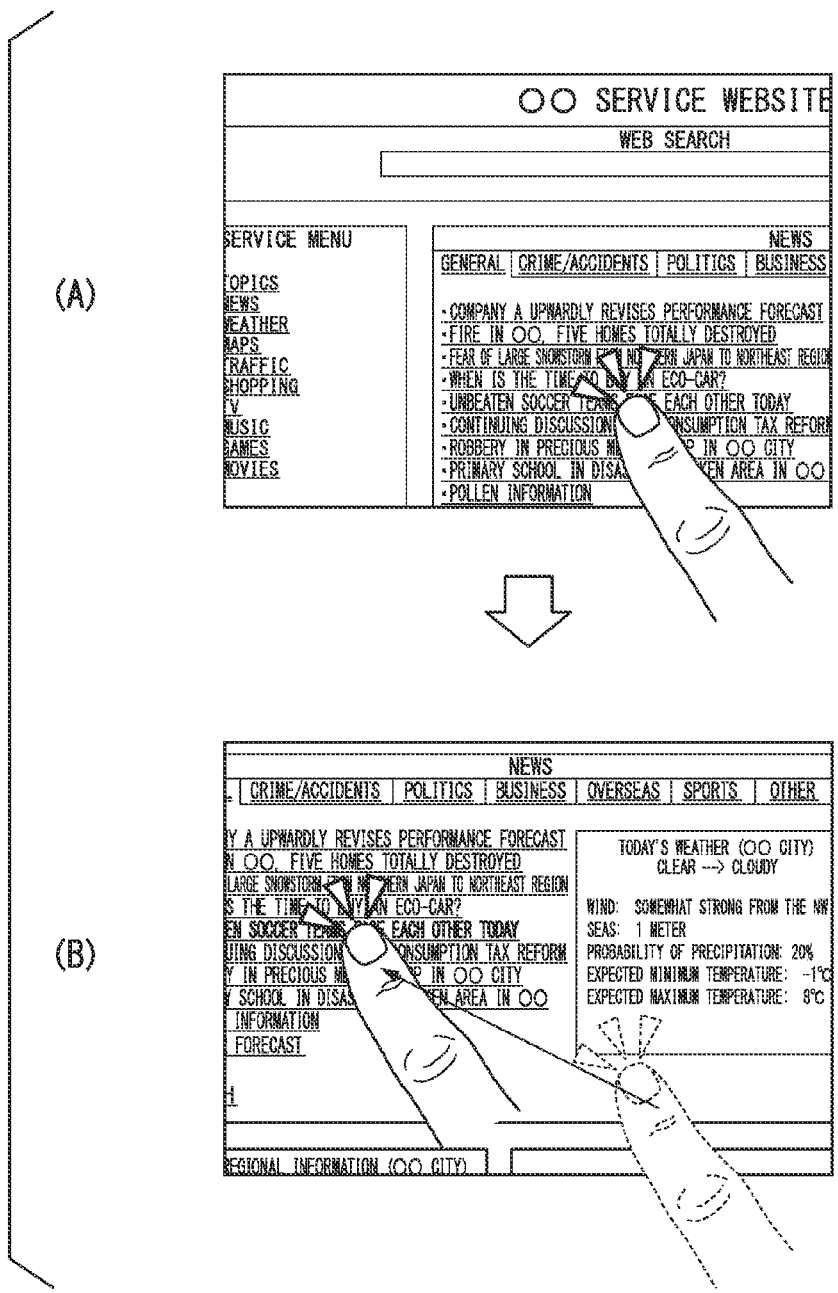
FIG. 3 is a descriptive drawing showing an example of display screen scrolling performed by a display device in the same embodiment.

FIG. 3 is a descriptive drawing showing an example of the scrolling of the screen display by the display device 101. In this drawing, (A) shows an example of the screen display before scrolling, and (B) shows an example of the screen display after scrolling. The display control unit 111 scrolls the screen display by the amount of movement of the touch position.

If, however, the judgment at step S131 is that the touch position has not moved (NO at step S131), the display control unit 111 judges whether or not a long press has been made (step S141). Specifically, the display control unit 111 judges whether or not at least a certain amount time has elapsed without the touch position moving from the condition in which the touch position detection unit 112 detects a touch.

If the judgment is that a long press has been made (YES at step S141), the display control unit 111 causes the display device 101 to display a menu window, and the application execution unit 116 performs processing in accordance with menu item selection (step S142), after which the processing of FIG. 2 is ended.

Figure 4:
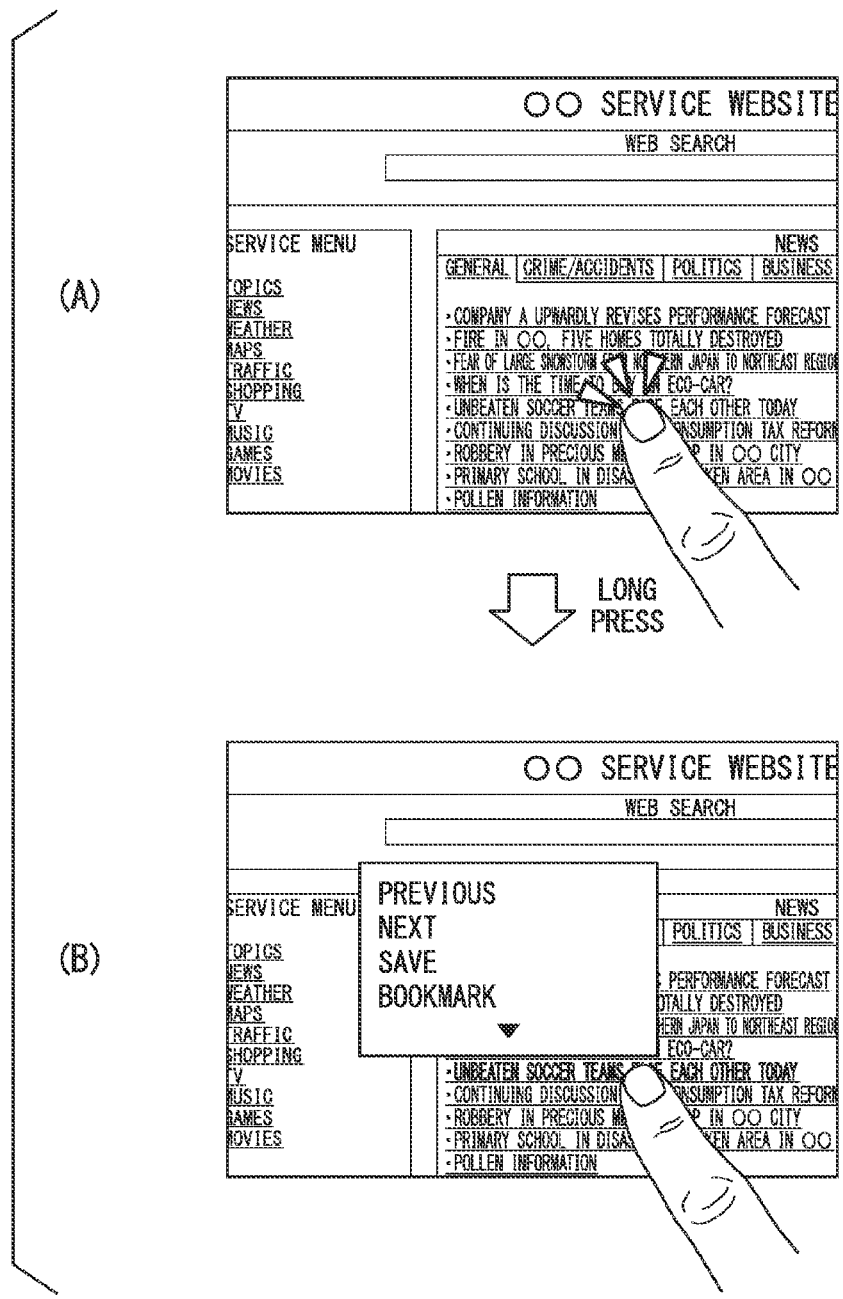
FIG. 4 is a descriptive drawing showing an example of a menu window displayed by the display device in the same embodiment.

FIG. 4 is a descriptive drawing showing an example of a menu window displayed by the display device 101. In this drawing, (A) shows an example of the screen display before the menu window display, and (B) shows an example of the screen display during a menu window display. The display control unit 111 detects a long press and causes a menu window to be displayed by the display device 101 in accordance with the application program execution state of the application execution unit 116.

If, however, the judgment at step S141 is that a long press has not been made (NO at step S141), the display control unit 111 judges whether or not the touch position detection unit 112 judged that the touch was broken (step S151). That is, if the touch position detection unit 112 no longer detects the touch position, the display control unit 111 judges that the touch being broken was detected.

If the judgment at step S151 is that the touch being broken was not detected (NO at step S151), return is made to step S111.

If, however, the judgment at step S151 is that the touch being broken was detected (YES at step S151), the selection unit 114 judges whether or not a hyperlink has been selected (step S152). If the judgment is that a hyperlink has not been selected (NO at step S152), the processing of FIG. 2 is ended.

If, however, the judgment is made that a hyperlink has been selected (YES at step S152), the selection unit 114 establishes the selection of the hyperlink, and the application execution unit 116 acquires the data of the web page of the link destination of the hyperlink (step S153). The display control unit 111 then causes the display device 101 to display the web page of the link destination (step S154), after which the processing of FIG. 2 is ended.

If, however, the judgment at step S111 is that the pressing force value is equal to or exceeds the pressing force reference value (YES at step S111), the display device 101 is caused to make an enlarged display and perform processing to accept a selection of an item to be selected (step S121). Details of that processing will be described later.

After the above, the processing of FIG. 2 is ended.

As shown in FIG. 2, if the pressing force value detected by the pressing force value detection unit 113 is smaller than the pressing force reference value, the information processing device 100 performs conventional processing, such as screen scrolling or menu processing, which is not accompanied by a change in the display magnification. If, however, the pressing force value detected by the pressing force value detection unit 113 is equal to or exceeds the pressing force reference value, the information processing device 100 performs functionally expanded processing, such as accepting selection of an item to be selected from an enlarged display. Therefore, by a simple selection operation of pressing or not pressing the display screen with a strong pressing force, the user can use a functional expansion of conventional operation without a feeling of unnaturalness.

<First Example of Functionally Expanded Processing>

Figure 5:
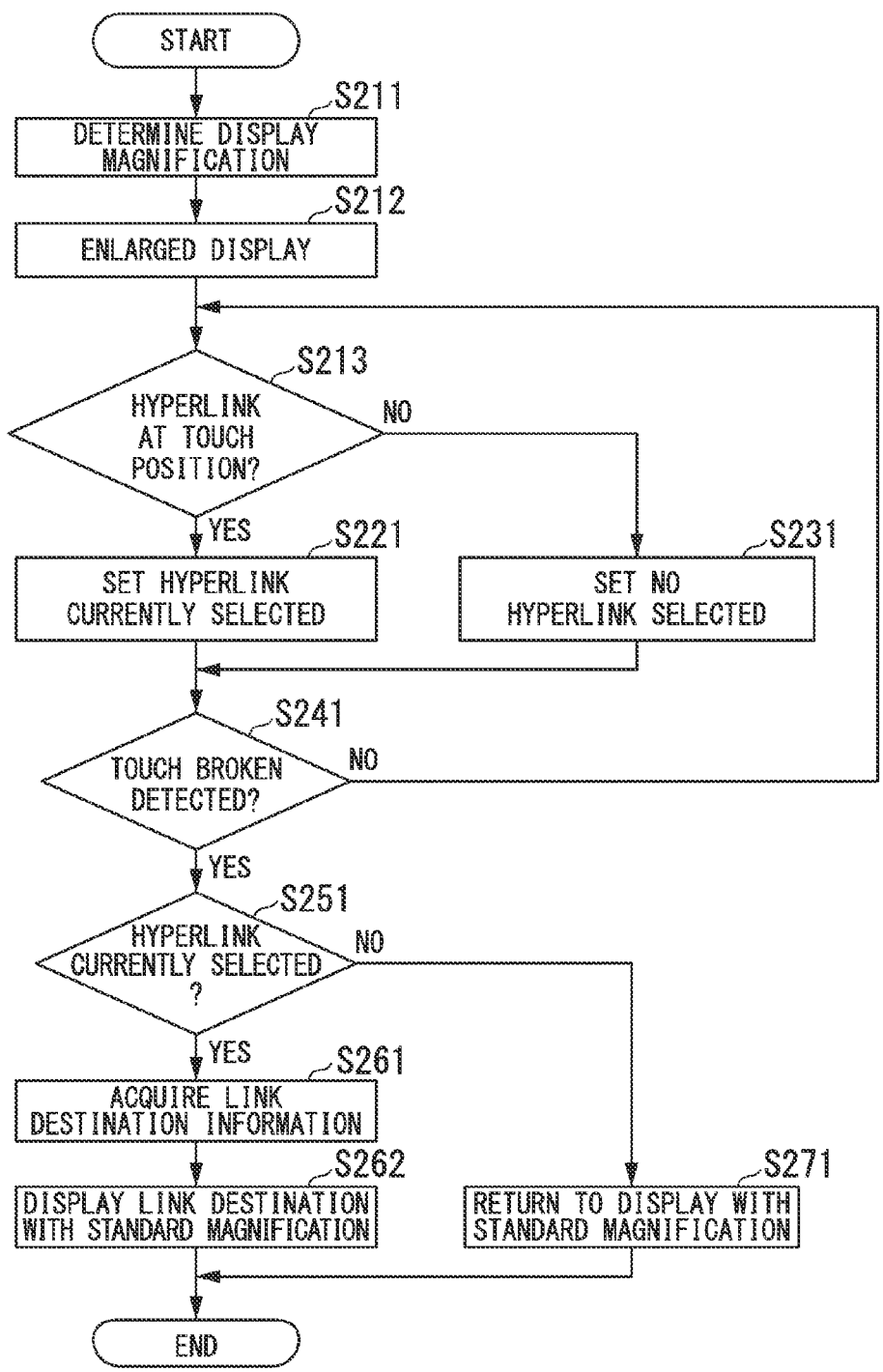
FIG. 5 is a flowchart showing a first example of a processing procedure performed by the information processing device in the same embodiment to cause a display device to make an enlarged display and to accept selection of an item to be selected.

FIG. 5 is a flowchart showing a first example of the processing procedure performed by the information processing device 100 to cause the display device 101 to make an enlarged display and to accept selection of an item to be selected. The information processing device 100 performs the processing of FIG. 5 at step S121 in FIG. 2.

In the processing of FIG. 5, the display control unit 111 first determines the display magnification of the enlarged display to be made on the display device 101 by reading out from the display magnification table stored by the display magnification table storage unit 121 the display magnification associated with the pressing force maximum value detected by the pressing force value detection unit 113 (hereinafter referred to as the pressing force maximum value) (step S211). Also, the display control unit 111 causes the display device 101 to make an enlarged display with the display magnification determined at step S211 (step 212).

FIG. 6 is a descriptive drawing showing an example of the display magnification table stored by the display magnification table storage unit 121. The display magnification table storage unit 121 stores display magnification table as data in the format of a table and, on each line, a range of the pressing force maximum value is associated with a display magnification. The ranges of the pressing force maximum value stored in pressing force maximum value column indicate ranges of the maximum value of the pressing force detected by the pressing force value detection unit 112 as relative values with respect to the pressing force reference value. The display magnifications stored in the display magnification column indicate the display magnification with which the display control unit 111 causes the display device 101 to make an enlarged display as percentages (%) of the reference display size. The term reference display size as used here refers to the display size at a standard magnification.

For example, the range of "1-1.1" shown in line L12 of the pressing force column indicates that the pressing force value is at least 1 and less than 1.1 times. If the maximum value of the pressing force value detected by the pressing force value detection unit 113 is within this range, the display control unit 111 references line L12 and reads out the display magnification of 125%. The display control unit 111 then causes the display device 101 to make an enlarged display with a display magnification of 125%.

Also, line L11 indicates as a verification that, when the pressing force value is less than the pressing force reference value and the NO transition is made at step S111 of FIG. 2, conventional processing with a display magnification of 100% is done.

However, the display magnification table stored by the display magnification table storage unit 121 is not restricted to the one shown in FIG. 6 and can be various tables.

FIG. 7 is a descriptive drawing showing another example of a display magnification table stored by display magnification table storage unit 121. In this drawing, if the pressing force maximum value is equal to or greater than 1.5, the display magnification gradually decreases, and if the pressing force maximum value is equal to or greater than 1.9, the display magnification is set to below 100%. In this case, the display control unit 111 causes the display device 101 to make a reduced display.

The display magnification may be made larger once again if the pressing force maximum value becomes even larger.

In a case such as when a web page is not completely displayed within the display screen before the start of pressing the display screen, the display device 101 can made a reduced display, so as to make a fuller display of the entire screen. Therefore, if the desired item to be selected does exists in a part that is not visible with the standard magnification, it is possible for the user to select it from a reduced display.

After step S212, the selection unit 114 detects the display positions of hyperlinks in the display screen of the display device 101 and judges whether or not there is a displayed hyperlink at the touch position detected by the touch position detection unit 112 (step S213).

If the judgment is that there is a corresponding hyperlink (YES at step S213), the selection unit 114 stores information indicating that the hyperlink is being selected or causes an emphasized display of the hyperlink (step S221).

Next, the display control unit 111 judges whether or not breaking of the touch was detected by the touch position detection unit 112 (step S241). If the judgment is that breaking of the touch was not detected (NO at step S241), return is made to step S213.

If, however, the judgment at step S241 is that the breaking of the touch was detected (YES at step S241), the selection unit 114 judges whether or not there had been a selected hyperlink in the state before the touch was broken (step S251). That is, the selection unit 114 judges whether or not there is a hyperlink stored as the hyperlink currently selected.

If the judgment is that there is a hyperlink being selected (YES at step S251), the selection unit 114 outputs information indicating the hyperlink to the application execution unit 116, and the application execution unit 116 acquires the data of the web page at the link destination of the hyperlink (step S261). Then, the display control unit 111 causes the display device 101 to display the webpage of the link destination with the standard magnification (step S262). In this manner, the selection of a hyperlink by a user making a touch operation is established by breaking the touch, and the information processing device 100 jumps to the link destination of the hyperlink.

After step S262, the processing of FIG. 5 is ended.

If, however, the judgment at step S213 is that there is no corresponding hyperlink (NO at step S213), the selection unit 114 makes the setting to no selected hyperlink (step S231). Specifically, if there is information stored indicating a selected hyperlink, the selection unit 114 deletes the information indicating the hyperlink and removes the emphasis from the hyperlink display.

After the above, processing proceeds to step S241.

If, however, the judgment at step S251 is that there is no selected hyperlink (NO at step S251), the display control unit 111 causes the display device 101 to display the screen display with the standard magnification (step S271).

After the above, the processing of FIG. 5 is ended.

Figure 8:
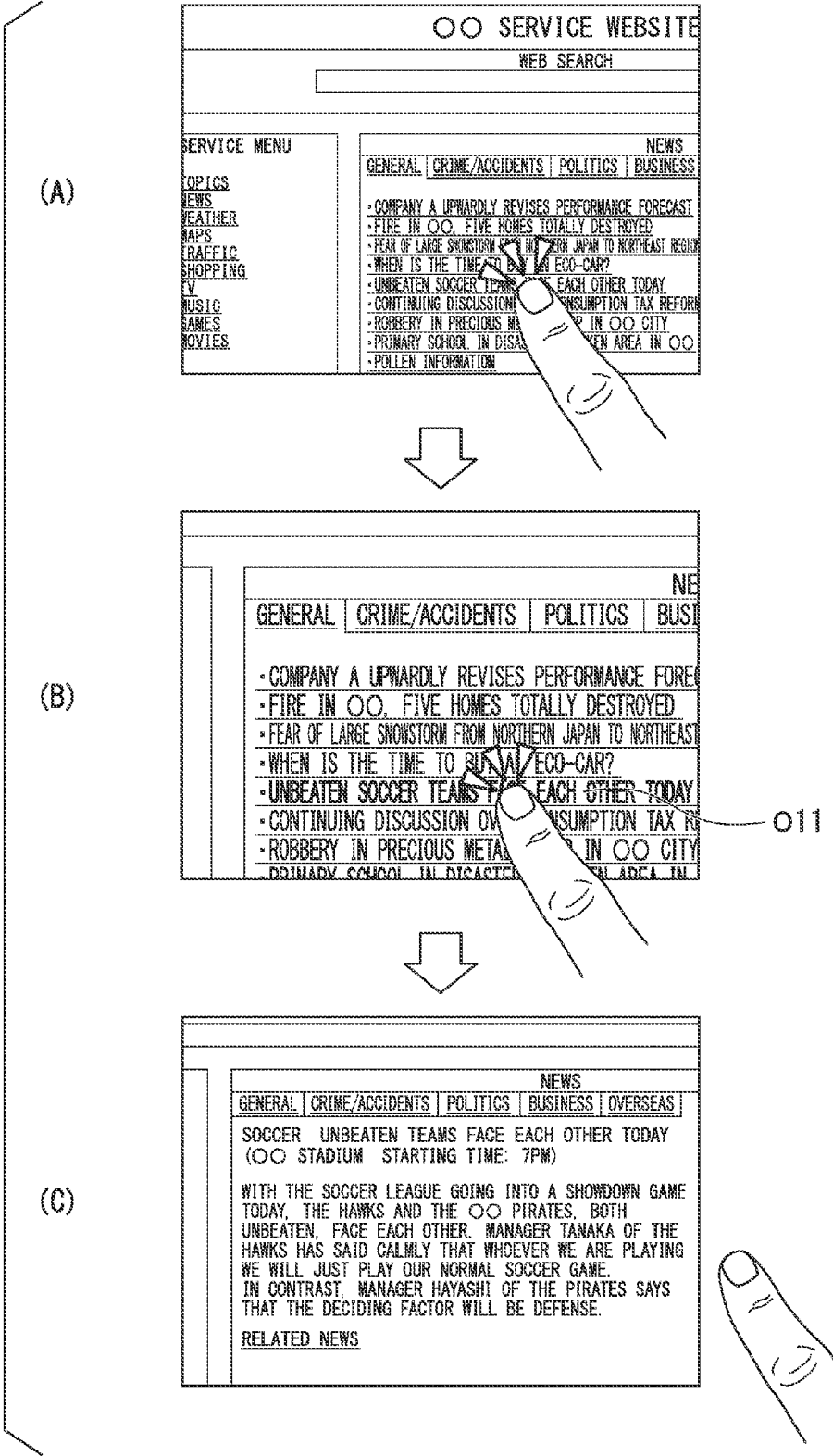
FIG. 8 is a descriptive drawing showing an example of a web page display made by a display device in FIG. 5 of the same embodiment.

FIG. 8 describes an example of a web page display made by the display device 101 in the processing of FIG. 5. In this drawing, (A) shows an example of the display in the state before the display device 101 makes an enlarged display (example of the usual conventional web page display). In the same drawing, (B) shows an example of the display in the state in which the display device 101 makes an enlarged display by the operating procedure of the present invention. In this drawing, (C) shows an example of the display in the case in which the display device 101 has displayed the webpage of the link destination (example of a web page display after transition is made to a link destination in accordance with the operating procedure of the present invention).

As shown in (A) of this drawing, when a touch is made on the display screen in the state in which the display device 101 is displaying a web page, the display control unit 111 causes the display device 101 to make an enlarged display of the webpage, so that center of the display is the same as the touch position detected by the touch position detection unit 112. In the example at (B), an enlarged display is made of the web page display in the example of (A), with the touch position shown by the picture of the finger at the center thereof.

If there is an item to be selected at the touch position detected by the touch position detection unit 112, the display control unit 111 emphasizes the display thereof as an item to be selected being selected. In the example shown in (B), the character string "Unbeaten soccer teams face each other today", which indicates one news item is item to be selected O11 and is displayed at the touch position. This being the case, the display control unit 111 causes the display device 101 to make an emphasized display of the item to be selected O11.

In the example of (B), if the user checks the currently selected news item to be viewed releases the finger, the display control unit 111 causes the display device 101 to display the web page of the link destination of the item to be selected O11 with the standard magnification.

In this case, if the currently selected item to be selected is not the desired item to be selected, the user can move the finger to change the touch position and change the selection to another item to be selected.

Figure 9:
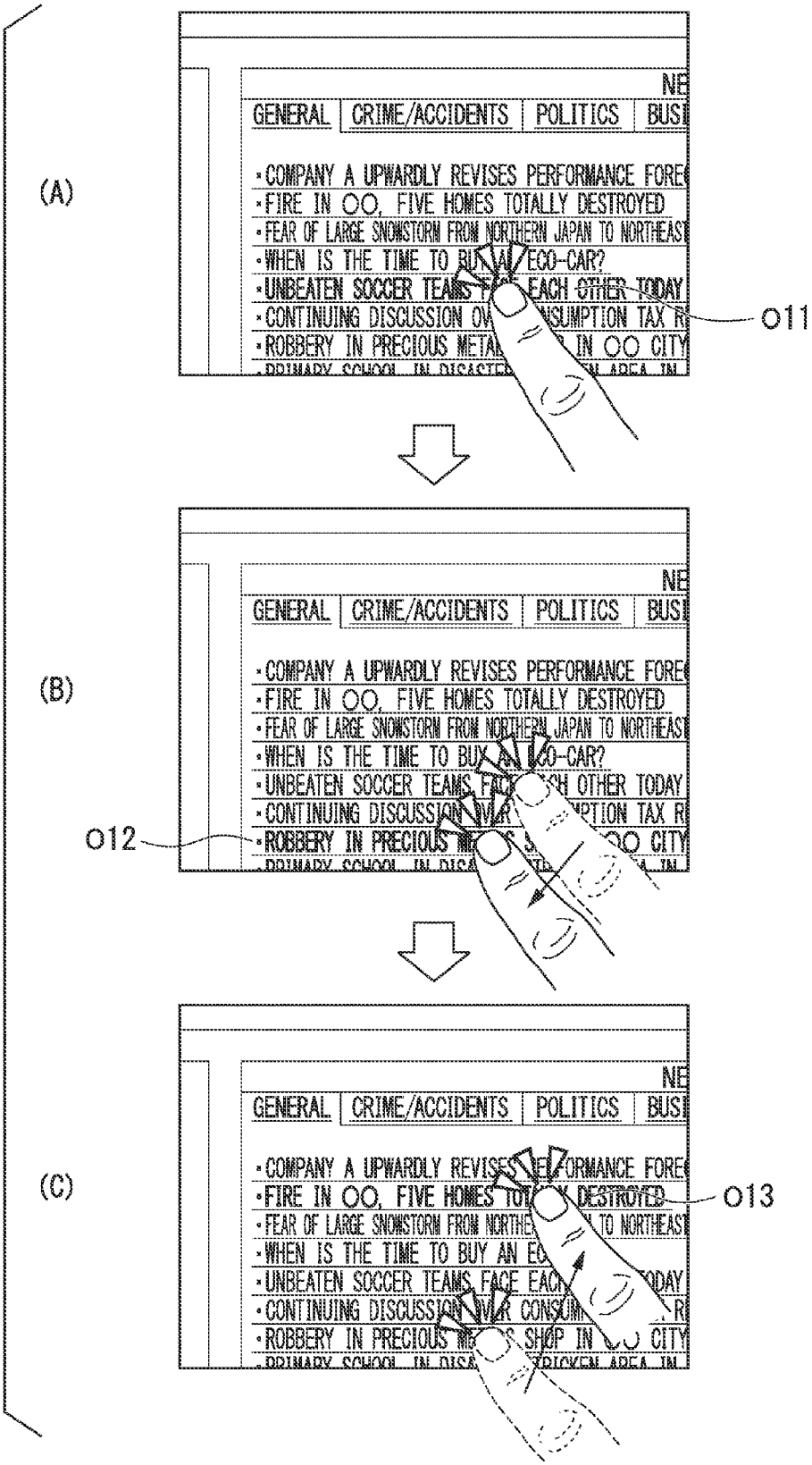
FIG. 9 is a descriptive drawing showing an example of changing the selection of the item to be selected in FIG. 5 of the same embodiment.

FIG. 9 describes an example of the selection unit 114 changing the selection of an item to be selected in the processing of FIG. 5. In the example (A), the selection unit 114 takes the item to be selected O11 as the item to be selected currently being selected, in accordance with the touch position detected by the touch position detection unit 112. Given this, if the user moves the finger to change the touch position as shown in (B), the selection unit 114 changes the selection in accordance with the change in the touch position and takes the item to be selected O12 as the item to be selected currently being selected. If the user moves the finger further to change the touch position as shown at (C), the selection unit 114 further changes the selection in accordance with the change in the touch position and takes the item to be selected O13 as the item to be selected currently being selected.

As noted above, in the processing shown in FIG. 5, by the display device 101 making an enlarged display, the user can more easily and reliably select the desired item to be selected while viewing items to be selected in an enlarged display.

In particular, when the pressing force value detection unit 113 detects a pressing force value equal to or exceeding a pressing force reference value, the display control unit 111 changes the display magnification, such as causing the display device 101 to make an enlarged display. Then, when the touch position detection unit 112 detects the breaking of the touch, the selection unit 114 selects the item to be selected based on the position that had been touched. Therefore, the user can perform the simple and continuous series of operations of touching the display screen with a pressing force value equal to or exceeding the pressing force reference value and then releasing the finger so that the display device 101 is made to change the display magnification and an item to be selected is selected. In this manner, the ability to perform a simple and continuous series of operations to have the display device 101 make an enlarged display and select an item to be selected enables the user to more reliably perform selection operations on the screen.

Also, by the display device 101 changing the format of the display of items to be selected, such as making an emphasized display of an item to be selected that is currently selected, the user is able to verify the item to be selected currently selected and reliably make a selection by breaking the touch, or to move the touch position to change to another item to be selected.

The display control unit 111 determines the display magnification of the display device 101 based on the pressing force value detected by the pressing force value detection unit 113. The user, therefore, can adjust the display magnification of the display device 101 by making the simply operation of adjusting the pressing force value of the touch.

The display control unit 111 determines the display magnification of the display device only one time from the time the user touches until the time the user removes the finger on the display screen, as the display magnification is determined only at step S211 of FIG. 5.

By doing this, it is possible for the display device 101 to continue the screen display with the same display magnification even if the user makes an unintentional change in the pressing force value. It is therefore not necessary for the user to maintain a constant pressing force value when moving the touch position, such as when making an operation to change the item to be selected, thereby enabling simpler operation.

The display control unit 111 causes the display device 101 to display the link destination of an item to be selected the selection of which has been established by the selection unit 114 with the standard magnification.

In this case, if the display device 101 displays the link destination while remaining in the state of the enlarged display, the view of the display of the link destination is hampered, such as it not being possible for the user to view the entire page. Given this, the display device 101 displays the link destination with the standard magnification, enabling a link destination display easy for the user to view.

By displaying the link destination with the standard magnification, the display device 101 can also coexist with conventional specifications, whereby the link destination is displayed with the standard magnification, without making an enlarged display.

The selection unit 114 may set an item to be selected to the currently selected item not only when the display of an item to be selected is touched, but also when the vicinity of the display of an item to be selected is touched. This point will be described making reference to FIG. 10 and FIG. 11.

Figure 10:
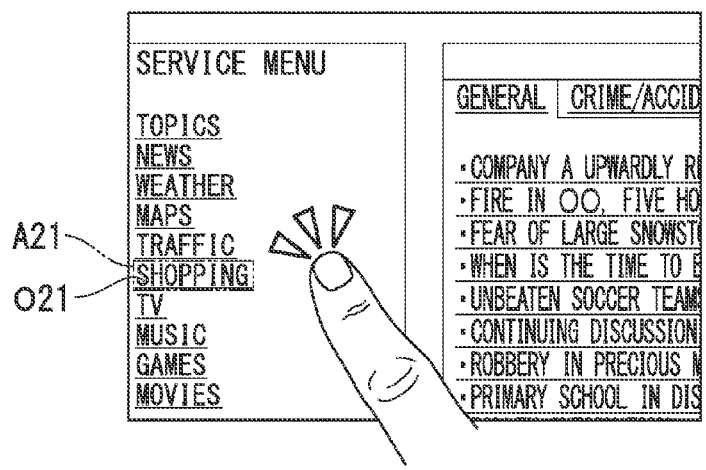
FIG. 10 is a descriptive drawing showing the relationship between the selection region set for an item to be selected and the touch position in the same embodiment.

FIG. 10 describes the relationship between the selection region set for an item to be selected and the touch position. In this drawing, the region A21 the character string of the item to be selected O21 is set as the selection region for the item to be selected O21. The term selection region as used here refers to the region to be detected, in which a touch operation is taken to be an operation to select the item to be selected.

If, however, the user touches outside the region A21, the selection unit 114 does not select the item to be selected.

Given this, the selection region may be set to be larger, so that the selection unit 114 makes a selection even if the user touches in the vicinity of the display of the character string.

Figure 11:
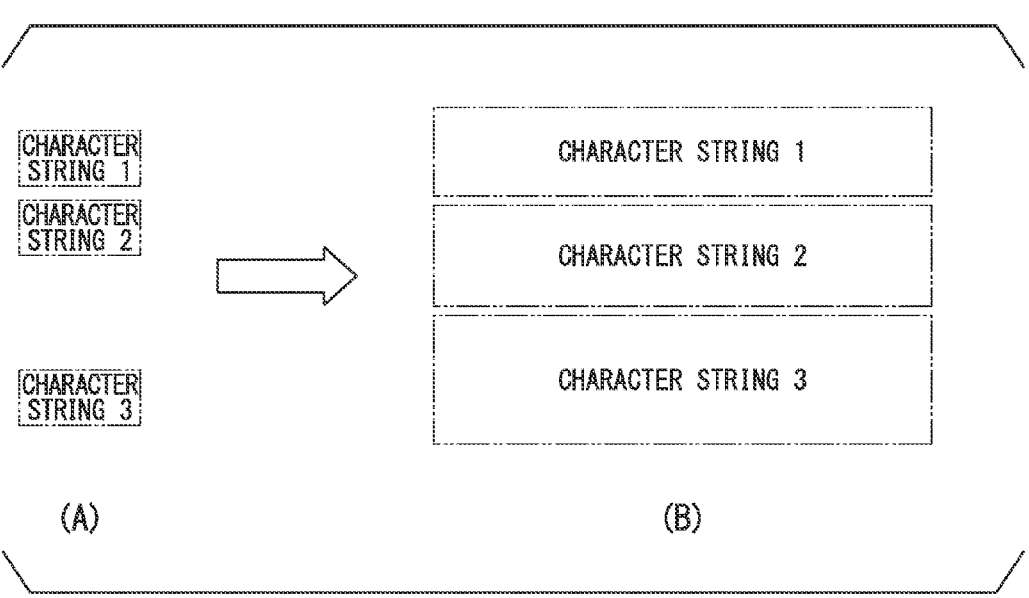
FIG. 11 is a descriptive drawing showing an example of setting the selection region to be larger in the same embodiment.

FIG. 11 is a descriptive drawing showing an example of setting the selection region to be larger.

The selection region for a hyperlink is generally set to be a region that nominally surrounds a character string, such as shown at (A) in this drawing. In contrast, at (B) each of the selection regions is set to be larger, so as to include the gap between one character string and another and also the regions at the left and right of character strings. By enlarging the set selection regions in this manner, the user can more easily make selection operations, such as being able to make a selection operation even in a case, for example, in which the image of an item to be selected displayed by the display device 101 is small and cannot be pressed precisely.

When an enlarged display is made, the selection unit 114 may be made to set the selection region to be larger than the case of the display with the standard magnification.

Figure 12:
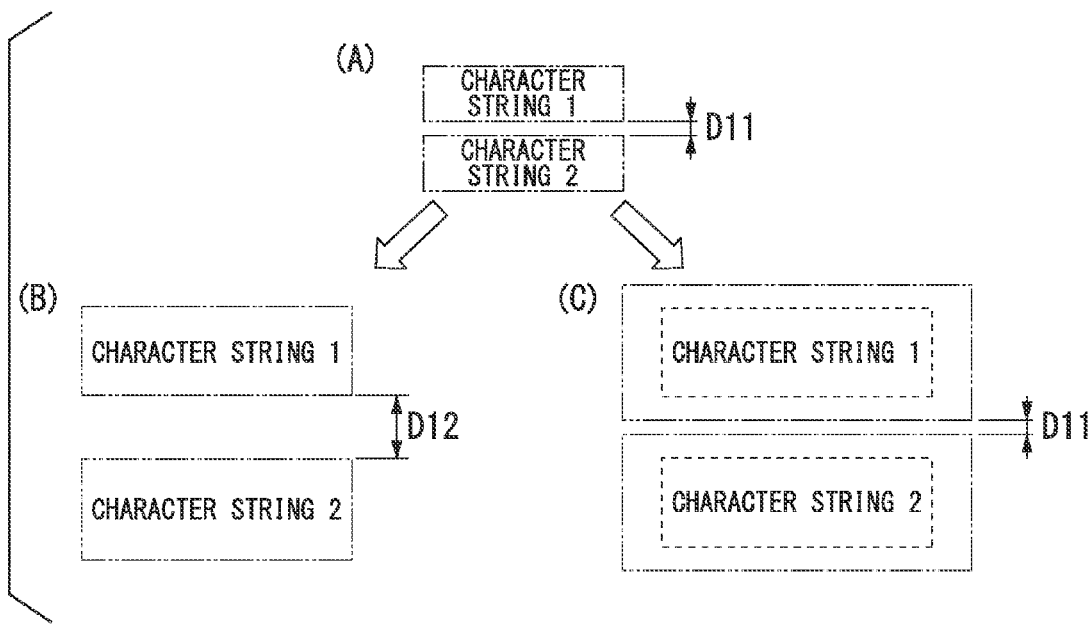
FIG. 12 is a descriptive drawing showing an example of setting the selection region to be larger when a magnified display is made in the same embodiment.

FIG. 12 is a descriptive drawing showing an example in which the selection regions are set to be larger when an enlarged display is being made.

In this drawing, (A) shows an example of the selection regions in a display with the standard magnification and (B) shows an example of the selection regions enlarged as is in the display of the selection regions in (A). In this drawing, (C) shows an example of the selection regions set to be larger than the selection regions in (B).

From the standpoint of preventing selection errors, it is preferable to provide a fixed distance (hereinafter called a "guaranteed gap distance") between selection regions. In FIG. 12 (A) the guaranteed gap distance D11 is provided as a gap between the selection region of character string 1 and the selection region of character string 2.

At (B) in this drawing, which is FIG. 12 (A) enlarged as is, a gap of the distance D12, which is larger than the guaranteed gap distance D11, exists between character string 1 and character string 2. That is, in (B) it is possible to maintain the guaranteed gap distance D11 even if the selection regions are made larger. By setting the selection regions to be larger, the user can select an item to be selected without making a precise touch.

Given this, the selection unit 114 may set the selection regions to be larger, such as shown at (C) in FIG. 12, while maintaining the gap of the guaranteed gap distance D11 between the selection region of character string 1 and the selection region of character string 2.

For example, the selection unit 114 sets the selection range larger by a fixed distance, in accordance with the enlarged display. Then, for a selection region for which it is not possible to maintain the guaranteed gap distance D11, the selection unit 114 removes the part in the guaranteed gap distance D11 from the selection region.

Figure 13:
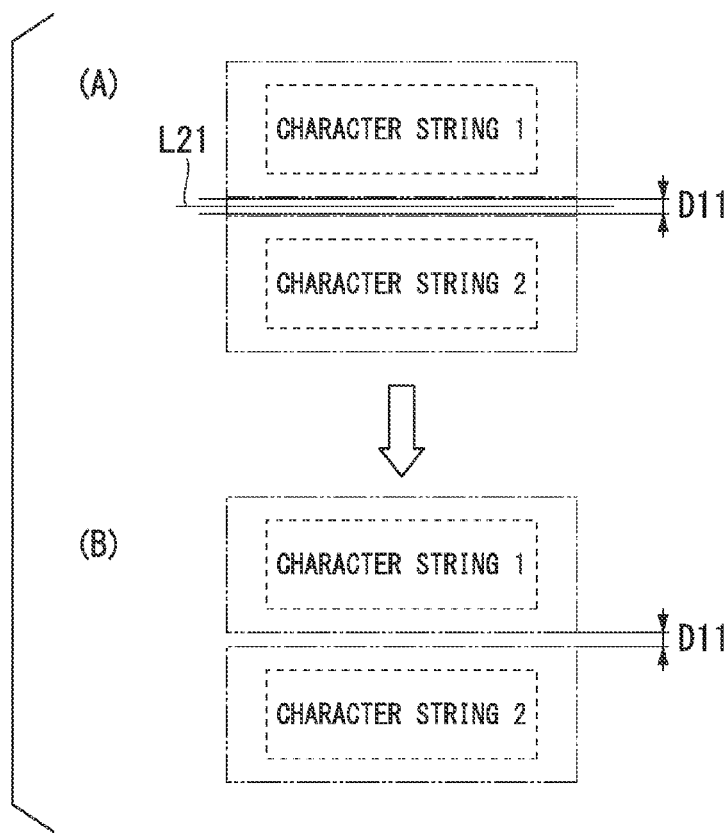
FIG. 13 is a descriptive drawing showing an example of the selection unit eliminating a part of the selection region in the same embodiment.

FIG. 13 is a descriptive drawing showing an example of the selection unit 114 eliminating a part of the selection region. In (A) in this drawing, as a result of making the selection region of character string 1 and the selection region of character string 2 larger, there is an overlap between the selection regions, and it is not possible to establish the guaranteed gap distance D11.

Given this, the selection unit 114 removes a part of the selection regions, to the extent of the guaranteed gap distance D11, so as to establish the guaranteed gap distance D11 as shown at (B). The selection unit 114, for example, provides a gap as the guaranteed gap distance D11 having as its center the center line L21 in the overlapping part between the selection regions in (A) in this drawing.

Alternatively, the selection unit 114 may make the selection regions larger without providing a gap between the selection regions.

Figure 14:
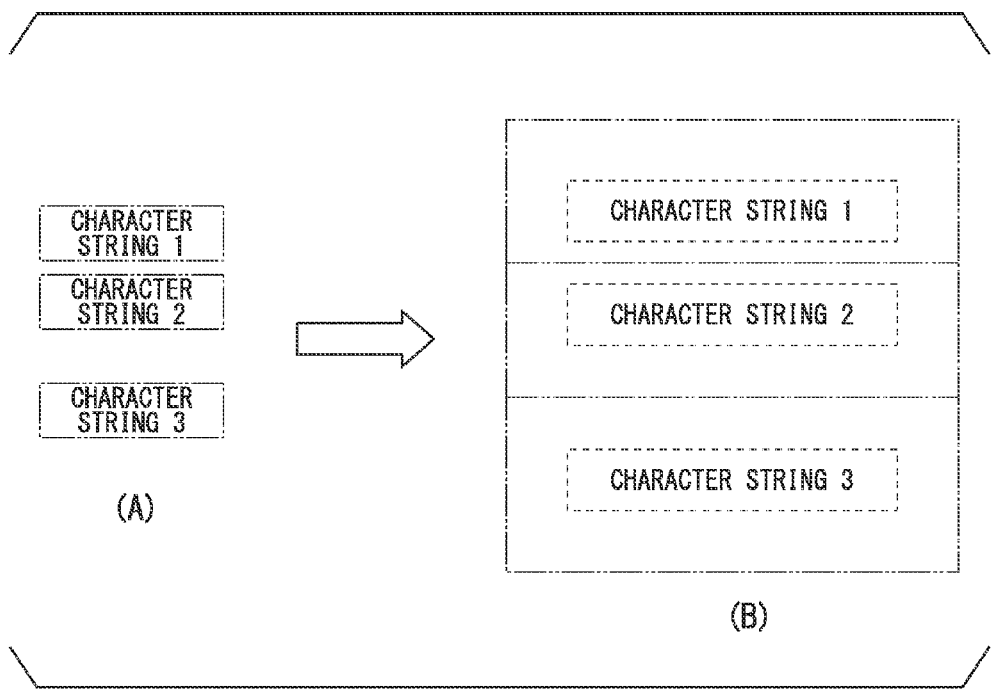
FIG. 14 is a descriptive drawing showing an example of setting the selection regions to be larger without providing a gap between selection regions in a magnified display in the same embodiment.

FIG. 14 is a descriptive drawing showing an example of making the selection regions larger without providing a gap between the selection regions in an enlarged display.

In this drawing, (A) shows an example of the selection regions for a display with the standard magnification. In this drawing, (B) shows an example of the selection regions set to be larger in an enlarged display. By the selection unit 114 setting the selection regions to be even larger in this manner, the user can select an item to be selected with an even less precise touch.

For example, the selection unit 114 sets the selection range to be larger by a fixed distance according to the enlarged display. Then, for the overlapping part between the selection regions, the selection unit 114 removes a part of the selection regions to eliminate the overlapping.

Figure 15:
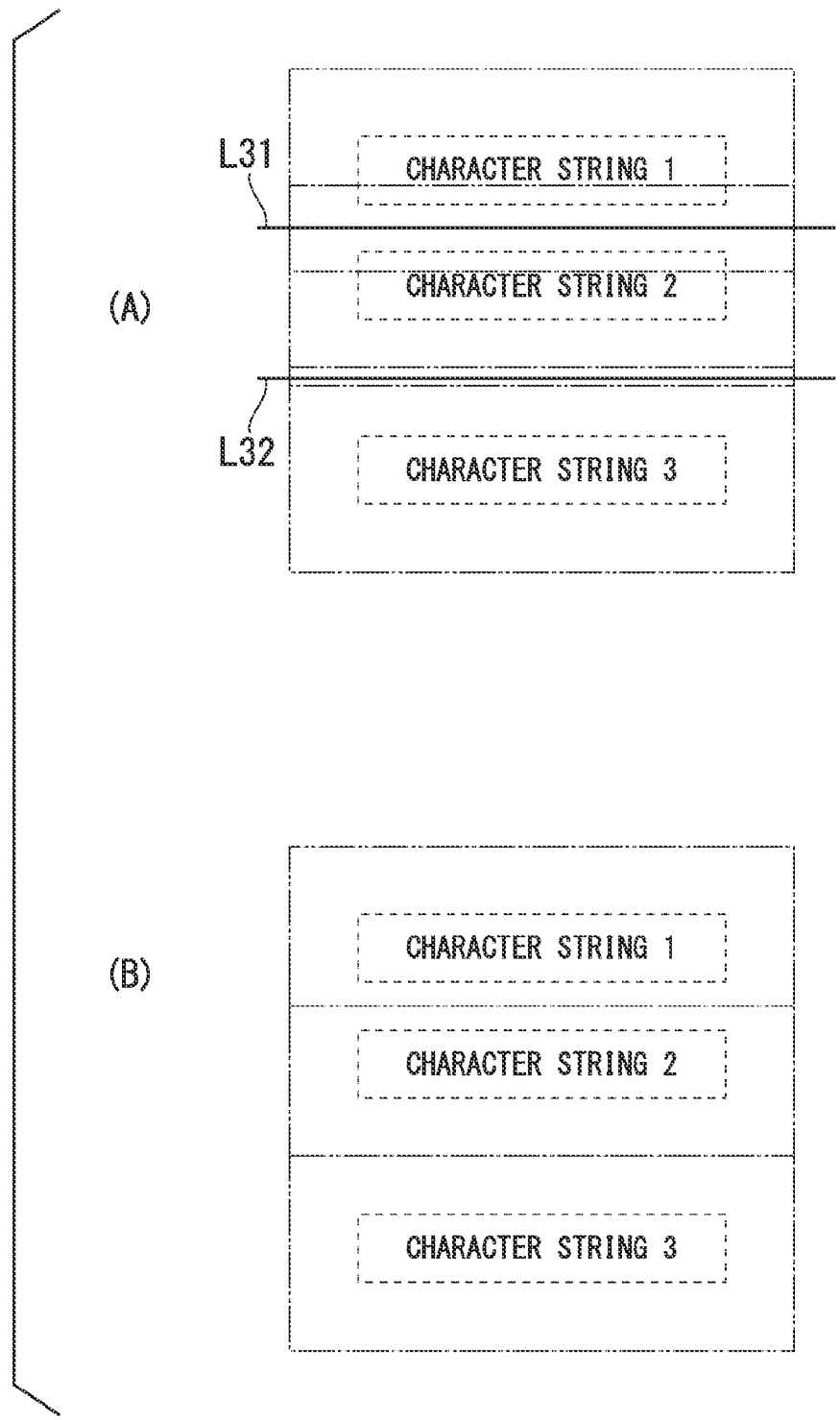
FIG. 15 is a descriptive drawing showing an example of the selection unit eliminating overlapping of selection regions in the same embodiment.

FIG. 15 is a descriptive drawing showing an example of the selection unit 114 eliminating overlapping of selection regions, and in (A) making the selection region of character string 1 and the selection region of character string 2 larger results in an overlapping between the selection regions in (A).

Given this, the selection unit 114 removes a part of the selection regions that overlaps, thereby eliminating the overlapping, as shown at (B). The selection unit 114, for example, removes from the selection regions the parts that extend outside the center line L31 or L32 of the overlapping part between the selection regions.

<Second Example of Functionally Expanded Processing>

Figure 16:
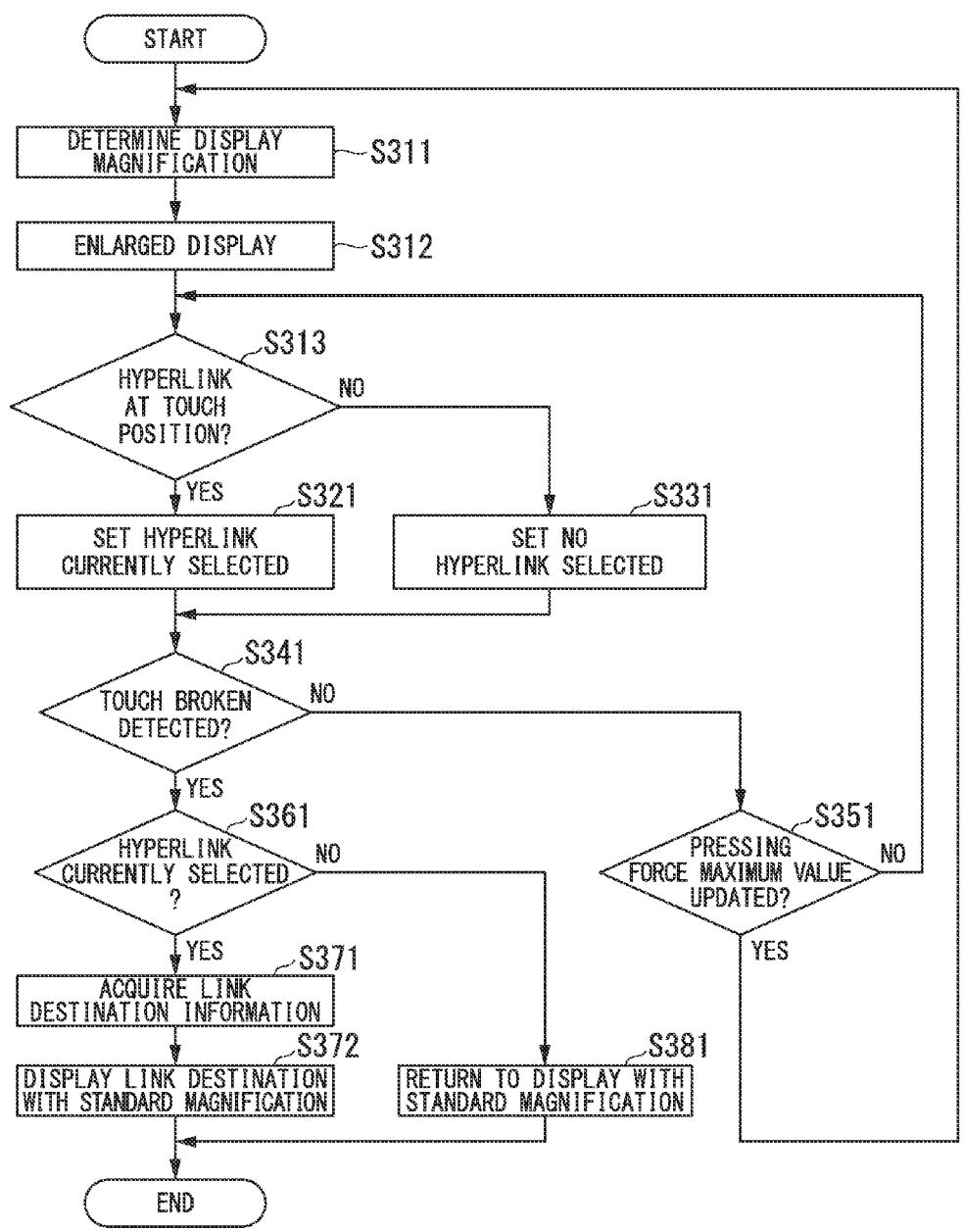
FIG. 16 is a flowchart showing a second example of the processing procedure performed by the information processing device in the same embodiment to cause the display device to make an enlarged display and to accept selection of an item to be selected.

FIG. 16 is a flowchart showing a second example of the processing procedure performed by the information processing device 100 to cause the display device 101 to make an enlarged display and to accept selection of an item to be selected. The information processing device 100 performs the processing of FIG. 16 at step S121 of FIG. 2 instead of the processing of FIG. 5.

In FIG. 16, steps S311 to S341 are the same as steps S211 to S241 of FIG. 5, and steps S361 to S381 of FIG. 16 are the same as steps S251 to S271 of FIG. 5.

However, the processing in FIG. 16 is different from that of FIG. 5 in that, if it is judged that the breaking of touch is not detected at step S341 (NO at step S341), processing proceeds to step S351.

At step S351, the display control unit 111 judges whether or not the pressing force maximum value detected by the pressing force value detection unit 113 is an update of the pressing force maximum value that serves as the basis for the current display magnification. If the judgment is that it is not updated (NO at step S351), return is made to step S313. If, however, the judgment is that the pressing force maximum value is updated (YES at step S351), return is made to step S311.

Figure 17:
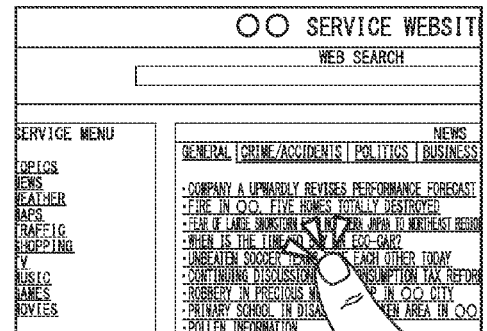
FIG. 17 is a descriptive drawing showing an example of a web page display made by a display device in the processing of FIG. 16 in the same embodiment.
Figure 17:
Figure 17:
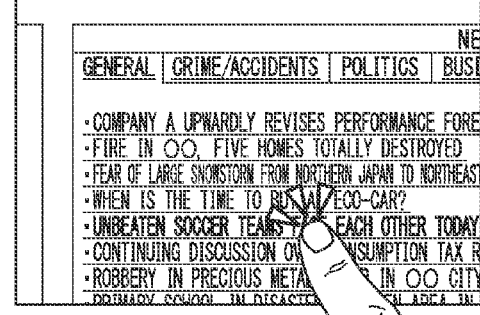
Figure 17:
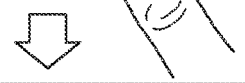
Figure 17:
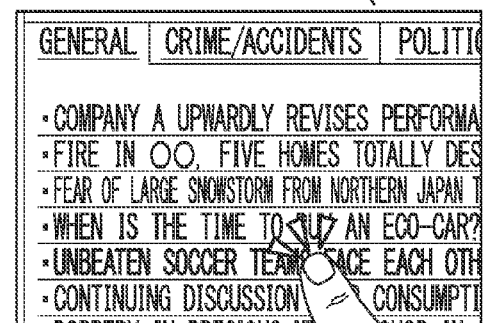
Figure 17:
Figure 17:
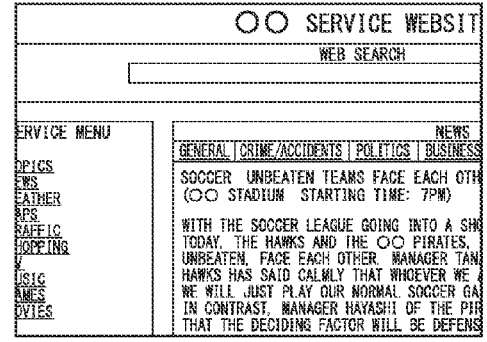
Figure 17:
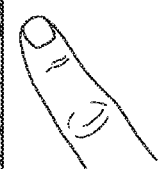

FIG. 17 is a descriptive drawing showing an example of a web page display made by the display device 101 by the processing of FIG. 16. In this drawing, (A) shows an example of the display in the state before the display device 101 makes an enlarged display (state in which a pressing force equal to or exceeding the pressing force reference value is not applied). In this drawing, (B) shows an example of the display in the state in which the display device 101 makes an enlarged display (state that is the same as when an enlarged display is made at step S212 of FIG. 5). In this drawing, (C) shows an example of the display in the state in which the display device 101 makes an enlarged display with a larger display magnification (state for the case in which the enlarged display is made in accordance with the second example of functionally expanded processing. In this drawing, (D) shows an example of the display when the display device 101 displays the web page at the link destination with the standard magnification.

By the display control unit 111 repeatedly determining the display magnification at step S311 of FIG. 16, if a web page is viewed with a display magnification differing from the current display magnification, the user can make a simple operation such as pressing the display screen harder to change the display magnification of the display device 101 as in an example of a change from (B) to (C) in FIG. 17.

Also, by the display control unit 111 determining the display magnification based on the pressing force maximum value, even if the user weakens the pressing force the display device 101 can continue the screen display with the same display magnification. The user therefore can weaken the pressing force, such as when moving the finger to change the item to be selected, enabling easier operation.

In the same manner as in the processing of FIG. 5, various things, such as shown in FIG. 6 or shown in FIG. 7 can be used as the display magnification table that is stored by the display magnification table storage unit 121.

<Third Example of Functionally Expanded Processing>

Figure 18:
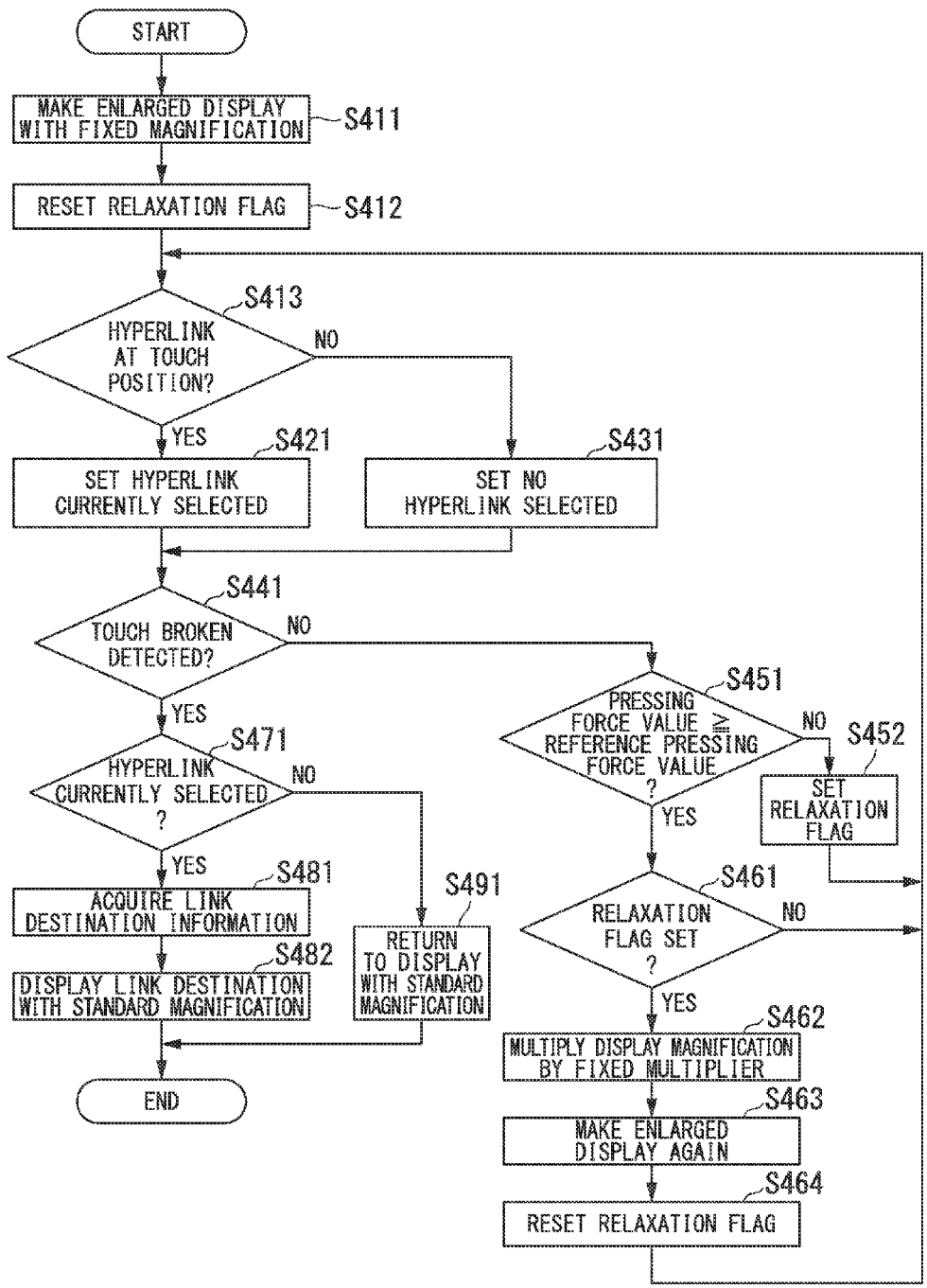
FIG. 18 is a flowchart showing a third example of the processing procedure performed by the information processing device in the same embodiment to make an enlarged display on the display device and to accept selection of an item to be selected.

FIG. 18 is a flowchart showing a third example of the processing procedure performed by the information processing device 100 to cause the display device 101 to make an enlarged display and to accept selection of an item to be selected. The information processing device 100 performs the processing of FIG. 18 instead of the processing of FIG. 5. at step S121 of FIG. 2

In the processing of FIG. 18, the display magnification table storage unit 121 stores fixed multipliers instead of a display magnification table. The fixed multipliers as used herein are constants with which the current display magnification is multiplied in order to calculate the display magnification with which the display device 101 is to be made to make an enlarged display. Although the following description will be for a fixed multiplier of 150%, this is not a restriction and can be made various values.

In the processing of FIG. 18, the display control unit 111 stores a relaxation flag. The term relaxation flag used herein refers to a flag used to detect that the pressing force value has at some point fallen below the pressing force reference value. The relaxation flag indicates in a set state that the pressing force value has at some point fallen below the pressing force reference value and in the reset state indicates that the pressing force value remains equal to or greater than the pressing force reference value.

In the processing of FIG. 18, the display control unit 111 first causes the display device 101 to make an enlarged display with the fixed multiplier (step S411). Next, the display control unit 111 resets the relaxation flag (step S412).

Steps S413 to S441 are the same as step S213 to S241 of FIG. 5, and steps S471 to S491 are the same as steps S251 to S271 in FIG. 5.

However, in FIG. 18 a difference with respect to the processing of FIG. 5 is that if the breaking of the touch is not detected at step S441 (NO at step S441) processing proceeds to step S451.

At step S451, the display control unit 111 judges whether or not the pressing force detected by the pressing force value detection unit 113 is equal to or exceeds the pressing force reference value. If the judgment is that the pressing force is below the pressing force reference value (NO at step S451), the display control unit 111 sets the relaxation flag (step S452), after which return is made to step S413.

If, however, the judgment at step S451 is that the pressing force detected by the pressing force value detection unit 113 is equal to or exceeds the pressing force reference value (YES at step S451), the display control unit 111 judges whether or not the relaxation flag is set (step S461). If the judgment is that the relaxation flag is not set (NO at step S461), return is made to step S413.

If, however, the judgment is that the relaxation flag is set (YES at S461), the display control unit 111 multiplies the current display magnification of the display device 101 by a fixed multiplier to calculate a new display magnification (step S462). The display control unit 111 then causes the display device 101 to make an enlarged display with the display magnification calculated at step S462 (step S463). Next, the display control unit 111 resets the relaxation flag (step S464).

After the above, return is made to step S413.

Doing the above, at steps S451 to S461 when the display control unit 111 detects that the pressing force returns once again to be equal to or exceed the pressing force reference value after having once been relaxed, it causes the display device 101 to make a further enlarged display at step S463. By doing this, it is possible for the user make a large change in the display magnification of the display device 101 by the simple operation of relaxing the pressing force and then once again increasing the pressing force, without the need to apply that great a force. Because the display is enlarged in a stepwise manner by a fixed multiplier in accordance with the number of times the pressing force is applied that equals or exceeds the pressing force reference value, it is not necessary for the user to make a fine adjustment of the pressing force applied in order to achieve a desired magnification.

FIG. 19 is a descriptive drawing showing the change of the display magnification of the display device 101 in the processing of FIG. 18. This drawing shows the change in the display magnification of the display device 101 for the case in which the fixed multiplier is set to 150%.

When the pressing force value detection unit 113 first detects a pressing force equal to or exceeding the pressing force reference value, the display control unit 111, at step S411 of FIG. 18, causes the display device 101 to make an enlarged display with fixed multiplier of 150%.

After that, if the pressing force value falls once below the pressing force reference value and then the pressing force value detection unit 113 detects that it equals or exceeds the pressing force reference value again, the display control unit 111, at step S462, multiplies the current display magnification of the display device 101 of 150% by the fixed multiplier of 150% to calculate the new display magnification of 225%. Then, at step S463, the display control unit 111 causes the display device 101 to make an enlarged display with the calculated display magnification of 225%.

After the above, if the pressing force again falls below the pressing force reference value and subsequently the pressing force value detection unit 113 detects that it equals or exceeds the pressing force reference value, the display control unit 111, at step S462, multiplies the current display magnification of 225% by the fixed multiplier of 150% of the display device 101 to calculate the new display magnification of 338%. Then, at step S463, the display control unit 111 causes the display device 101 to make an enlarged display with the calculated display magnification of 338%.

In this manner, each time the pressing force is relaxed and then made to equal or exceed the pressing force reference value, the display control unit 111 makes the display magnification of the display device 101 larger.

In the processing of FIG. 18, the display control unit 111 may calculate a new display magnification by multiplying the current display magnification by a coefficient in accordance with the pressing force value detected by the pressing force value detection unit 113. For example, the display magnification table storage unit 121 may store a coefficient table rather than fixed multipliers, and the display control unit 111 may be made to read out from the table coefficients corresponding to the pressing force value detected by the pressing force value detection unit 113.

FIG. 20 is a descriptive drawing showing an example of the change in the display magnification of the display device 101 in the case in which the display control unit 111 uses a coefficient in accordance with the pressing force detected by the pressing force value detection unit 113.

When the pressing force detection unit 113 first detects pressing force equal to or exceeding the pressing force reference value, at step S411 of FIG. 18 the display control unit 111 causes the display device 101 to make an enlarged display with a coefficient of 200% in accordance with the pressing force value detected by the pressing force value detection unit 113.

After the above, after the pressing force value falling below the pressing force reference value at some time, if the pressing force value detection unit 113 detects that the pressing force value again equals or exceeds the pressing force reference value, the display control unit 111, at step S462, multiplies the current display magnification of 200% of the display device 101 by the coefficient of 200% in accordance with the pressing force value detected by the pressing force value detection unit 113 to calculate the new display magnification of 400%. Then, at step S463, the display control unit 111 causes the display device 101 to make an enlarged display with the calculated display magnification of 400%.

After the above, after the pressing force value again falls below the pressing force reference value at some time and then the pressing force value detection unit 113 detects a pressing force that is equal to or exceeds the pressing force reference value, the display control unit 111, at step S462, multiplies the current display magnification of 400% of the display device 101 by the coefficient of 50% in accordance with the pressing force value detected by the pressing force value detection unit 113 to calculate the new display magnification of 200%. Then, at step S463, the display control unit 111 causes the display device 101 to make an enlarged display with the calculated display magnification of 200%.

By the display control unit 111 calculating the display magnification in accordance with the pressing force value, the user can have the display device 101 make an enlarged display with the desired display magnification by a simple operation of adjusting the strength of pressing on the display screen.

Also, by using a table including coefficients less than 100%, it is possible to return the enlarged display of the display device 101 to the display with the standard magnification, and further to make a reduced display.

Although the description in the above-noted example has been for a constitution in which the relaxation flag is set when the pressing force value falls below the pressing force reference value, the constitution may be made such that the relaxation flag is set when the pressing force value is reduced by a prescribed amount relative to the pressing force value at the time the relaxation flag was reset.

The display magnification table storage unit 121 may priorly store a display magnification table in which the number of times the pressing force equals or exceeds the pressing force reference value is associated with a display magnification, and the display control unit 111 may read out a new display magnification from the display magnification table.

FIG. 21 is a descriptive drawing showing an example of a display magnification table in which the number of times the pressing force equals or exceeds the pressing force reference value is associated with a display magnification.

In the state in which the pressing force value detection unit 113 does not detect a pressing force that is equal to or exceeds the pressing force reference value, the display control unit 111 causes the display device 101 to make a display with the standard magnification. Then, when the pressing force value detection unit 113 first detects a pressing force equal to or exceeding the pressing force reference value, the display control unit 111 causes the display device 101 to make a display with a display magnification of 200% according to the magnification table. Subsequently, after the pressing force value falls below the pressing force reference value at some point, each time the pressing force value detection unit 113 detects a pressing force again equal to or exceeding the pressing force reference value, the display control unit 111 changes the display magnification of the display device 101 according to the magnification table.

Diverse variations may be made of the display magnification table.

In the example of FIG. 21, after the display magnification becomes 400%, the display magnification goes into decrease, and after the display magnification reaches 100%, it once again increases. This enables the user to easily reset the magnification by making the magnification larger or smaller.

FIG. 22 is a descriptive drawing showing one more example of a display magnification table in which the number of times the pressing force equals or exceeds the pressing force reference value is associated with the display magnification.

In the example shown in this drawing, after the display magnification becomes 400%, the display magnification returns to 100%, after which it increases again up to 400%. By returning the display magnification to the standard magnification after it increases a certain amount in this manner, the user can easily reset the display magnification by making the magnification larger or smaller, similar to the example of FIG. 21.

FIG. 23 is a descriptive drawing showing yet another example of a display magnification table in which the number of times the pressing force equals or exceeds the pressing force reference value is associated with the display magnification.

In the example shown in this drawing, a display magnification smaller than 100% is included, based on which the display device 101 makes a reduced display. This enables the user to verify the existence of an item to be selected and the position thereof over a greater display range.

The processing of various parts may be performed by recording a program for implementing a part or all of the functionality of control unit 110 into a computer-readable recording medium and having a computer system read and execute the program recorded in the recording medium. The term "computer system" used here includes an operating system and hardware such as peripheral devices.

The term "computer system" may encompass a web page providing environment (or display environment) if the WWW system is utilized.

The term "computer-readable recording medium" refers to a removable medium such as a flexible disk, an optomagnetic disk, a ROM, a CD-ROM, or to a storage device such as a hard disk built into a computer system. Additionally, the term "computer-readable recording medium" may encompass one holding a program over a short time dynamically such as a communication line in the case in which a program is transmitted via a network such as the Internet or via a communication line such as a telephone line and one holding a program for a given period of time as a volatile memory within a computer system serving as a server or client. The above-noted program may be for implementing a part of the above-described functionality. Additionally, it may be one enabling implementation by combination with a program that already has recorded the above-noted functionality in a computer system.

Although the foregoing has been a description of embodiments of the present invention referring to drawings, the specific constitution is not limited to the embodiments, and may include various design modifications, within the scope of the spirit of the invention.

INDUSTRIAL APPLICABILITY

The present invention can be applied to a personal computer, a portable telephone handset, a smartphone, or a game machine or the like.

DESCRIPTION OF REFERENCE NUMERALS

100 Information processing device
101 Display device
102 Touch sensor
103 Communication unit
110 Control unit
111 Display control unit
112 Touch position detection unit
113 Pressing force value detection unit
114 Selection unit
115 Communication control unit
116 Application execution unit
120 Storage unit
121 Display magnification table storage unit
122 Pressing force reference value storage unit

The invention claimed is:

1. An information processing apparatus comprising:
   a touch position detector that detects a touch position of a touch performed on a display screen of a display device;
   a pressing force detector that detects a pressing force of the touch;
   a display controller that changes a display magnification of the display device in a case that the pressing force detector detects a pressing force equal to or greater than a prescribed pressing force; and
   a selector that establishes a selection of an item to be selected, based on the touched position in a case that the touch position detector detects that the touch is broken, wherein
   the item to be selected is associated with link information,
   the display controller causes, in a case that the touch position detector detects that the touch is broken while the display magnification of the display device with the display screen being touched has been changed since the pressing force detector has detected the pressing force equal to or greater than the prescribed pressing force while the display screen has been touched, the display device to display a link destination indicating the item to be selected with a standard magnification, the selection of which has been established by the selector based on the touch position,
   the display controller:
      increases the display magnification in proportion to an increase in the detected pressing force until the detected pressing force becomes a predetermined reference pressing force in a first case where the detected pressing force increases while the display screen has been touched, in a state that the display magnification of the display device with the display screen being touched has been changed since the pressing force detector has detected the pressing force equal to or greater than the prescribed pressing force while the display screen has been touched, and
      decreases the display magnification in proportion to the further increase in the detected pressing force, in a second case after the first case where the detected pressing force further increases exceeding the predetermined reference pressing force while the display screen has been touched, and
   the touch position detector, the pressing force detector, the display controller, and the selector are all controlled by a processor and a memory of the information processing apparatus.

2. The information processing device according to claim 1, wherein the display controller determines the display magnification of the display device based on the pressing force detected by the pressing force detector.

3. The information processing device according to claim 2 wherein the display controller changes the display magnification of the display device in accordance with a maximum pressing force in a case that the pressing force detector detects an updating of the maximum pressing force.

4. The information processing device according to claim 2, wherein the display controller further changes the changed display magnification of the display device in a case that the pressing force detector detects that the pressing force detected while the display screen has been touched becomes less than the prescribed pressing force, and thereafter again becomes equal to or greater than the prescribed pressing force, while the display magnification of the display device with the display screen being touched has been changed since the pressing force detector has detected the pressing force equal to or greater than the prescribed pressing force while the display screen has been touched.

5. The information processing device according to claim 4, wherein the display controller changes the display magnification in the display device at every time at which the pressing force detector detects a pressing force that is less than the prescribed pressing force, further followed by detection of a pressing force equal to or greater than the prescribed pressing force.

6. The information processing device according to claim 1, wherein the display controller causes the display device to make an enlarged display based on a pre-established fixed multiplier.

7. The information processing device according to claim 1, wherein the display controller changes a display format of an item to be selected in a case that the item to be selected is displayed at a touch position detected by the touch position detector.

8. The information processing device according to claim 1, wherein the selector sets a selection region of an item to be selected as a region larger than a region enlarged by the display magnification in a usual display enlarged on the display device by the display controller.

9. The information processing device according to claim 1, wherein the display controller performs processing that is not accompanied by a change of the display magnification in a state in which the pressing force detector does not detect a pressing force equal to or greater than the prescribed pressing force.

10. The information processing device according to claim 1, wherein both of a first pressing force and a second pressing force are detected by the pressing force detector from only a single pressing operation by a user of the information processing apparatus, the first pressing force being the detected pressing force until the detected pressing force becomes a predetermined reference pressing force, the second pressing force being the detected pressing force exceeding the predetermined reference pressing force.

11. The information processing device according to claim 10, wherein both of the first and the second pressing forces are detected by the pressing force detector without decreasing.

12. The information processing device according to claim 1, wherein
the display magnification is increased from a first display magnification to a second display magnification in the first case,
the display magnification is decreased from the second display magnification to a third display magnification, and
the third display magnification is smaller than the first display magnification.

13. A selection operation detection method of an information processing device, the selection operation detection method comprising:
detecting a touch position on a display screen of a touch performed on the display screen of a display device;
detecting a pressing force of the touch;
detecting a breaking of the touch;
changing a display magnification of the display device in a case that the pressing force equal to or greater than a prescribed pressing force is detected; and
establishing selection of an item to be selected, based on the touched position in a case that the touch being broken is detected, wherein the item to be selected is associated with link information, and
the selection operation detection method further comprises:
causing the display device to display with a standard magnification a link destination indicating the item to be selected in a case that it is detected that the touch is broken while the display magnification of the display device with the display screen being touched has been changed since the pressing force equal to or greater than the prescribed pressing force has been detected while the display screen has been touched, the selection of which has been established based on the touch position;
increasing the display magnification in proportion to an increase in the detected pressing force until the detected pressing force becomes a predetermined reference pressing force in a case that the detected pressing force increases while the display screen has been touched, in a state that the display magnification of the display device with the display screen being touched has been changed since the pressing force equal to or greater than the prescribed pressing force has been detected while the display screen has been touched; and
decreasing the display magnification in proportion to the further increase in the detected pressing force in a case that thereafter the detected pressing force further increases exceeding the predetermined reference pressing force while the display screen has been touched.

14. A non-transitory computer-readable recording medium storing a program causing a computer of an information processing device to execute:
detecting a touch position on a display screen of a touch performed on the display screen of a display device;
detecting a pressing force of the touch;
detecting a breaking of the touch;
changing a display magnification of the display device in a case that the pressing force is equal to or greater than a prescribed pressing force; and
establishing selection of an item to be selected, based on the touched position in a case that the touch being broken is detected, wherein
the item to be selected is associated with link information, and
the program causes the computer to further execute:
causing the display device to display with a standard magnification a link destination indicating the item to be selected, the selection of which has been established based on the touch position in a case that it is detected that the touch is broken while the display magnification of the display device with the display screen being touched has been changed since the pressing force equal to or greater than the prescribed pressing force has been detected while the display screen has been touched;
increasing the display magnification in proportion to an increase in the detected pressing force until the detected pressing force becomes a predetermined reference pressing force in a case that the detected pressing force increases while the display screen has been touched, in a state that the display magnification of the display device with the display screen being touched has been changed since the pressing force equal to or greater than the prescribed pressing force has been detected while the display screen has been touched; and decreasing the display magnification in proportion to the further increase in the detected pressing force in a case that thereafter the detected pressing force further increases exceeding the predetermined reference pressing force while the display screen has been touched.

\* \* \* \* \*